(12) United States Patent
Abe

(10) Patent No.: US 10,883,862 B2
(45) Date of Patent: Jan. 5, 2021

(54) MEASUREMENT-DATA COLLECTING APPARATUS AND COMPUTER PROGRAM

(71) Applicant: MITUTOYO CORPORATION, Kanagawa (JP)

(72) Inventor: Shinsaku Abe, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 163 days.

(21) Appl. No.: 16/166,711

(22) Filed: Oct. 22, 2018

(65) Prior Publication Data

US 2019/0120664 A1   Apr. 25, 2019

Related U.S. Application Data

(60) Provisional application No. 62/576,189, filed on Oct. 24, 2017.

(51) Int. Cl.
| | |
|---|---|
| *G06K 9/00* | (2006.01) |
| *G01D 5/39* | (2006.01) |
| *G02B 27/01* | (2006.01) |
| *G01D 21/00* | (2006.01) |
| *G06F 3/16* | (2006.01) |

(52) U.S. Cl.
CPC ............... *G01D 5/39* (2013.01); *G01D 21/00* (2013.01); *G02B 27/0172* (2013.01); *G02B 2027/014* (2013.01); *G02B 2027/0138* (2013.01); *G02B 2027/0178* (2013.01); *G06F 3/167* (2013.01)

(58) Field of Classification Search
CPC ..... G06T 7/70; G06T 1/0007; G06K 2209/03; G06K 9/3216; G06K 9/325
See application file for complete search history.

(56) References Cited

U.S. PATENT DOCUMENTS

| | | | |
|---|---|---|---|
| 4,973,957 A | 11/1990 | Shimizu et al. | |
| 5,136,285 A | 8/1992 | Okuyama | |
| (Continued) | | | |

FOREIGN PATENT DOCUMENTS

| | | |
|---|---|---|
| JP | H08-21154 B2 | 3/1996 |
| JP | 2589807 B2 | 3/1997 |
| (Continued) | | |

OTHER PUBLICATIONS

English translation of JP02013152198.*
(Continued)

*Primary Examiner* — Li Liu
(74) *Attorney, Agent, or Firm* — Greenblum & Bernstein, P.L.C.

(57) ABSTRACT

A measurement-data collecting apparatus configured to read a measurement value from a measurement result displayed on a measurement tool and easily collect measurement data irrespective of whether the measurement tool is an analog measurement tool or a digital measurement tool is provided. The measurement-data collecting apparatus of the present invention includes an image capturing unit configured to capture image of an exterior view of a target measurement tool on which a measurement result is displayed and a measurement-value reading unit configured to read a measurement value from an exterior view image of the target measurement tool imaged by the image capturing unit.

8 Claims, 9 Drawing Sheets

(56) References Cited

U.S. PATENT DOCUMENTS

| | | | |
|---|---|---|---|
| 6,909,793 B1* | 6/2005 | Mori | G06K 9/325 382/128 |
| 10,027,885 B2* | 7/2018 | Cho | G01B 21/04 |
| 2003/0138146 A1* | 7/2003 | Johnson | G06K 9/00 382/190 |
| 2005/0223815 A1* | 10/2005 | Florin | G01F 1/60 73/861.12 |
| 2007/0236366 A1* | 10/2007 | Gur | G06K 9/00 340/945 |
| 2009/0034788 A1* | 2/2009 | Sim | G01D 4/008 382/100 |
| 2011/0149067 A1* | 6/2011 | Lewis | G01D 3/08 348/135 |
| 2013/0204487 A1* | 8/2013 | Ovens | G06K 9/00832 701/33.2 |
| 2014/0067011 A1* | 3/2014 | Kaula | A61N 1/37247 607/59 |
| 2014/0180476 A1* | 6/2014 | Jaynes | G07F 17/0092 700/244 |
| 2014/0347482 A1* | 11/2014 | Weinmann | G06T 7/0002 348/144 |
| 2015/0211987 A1* | 7/2015 | Burg | G01N 35/00029 356/402 |
| 2015/0224650 A1* | 8/2015 | Xu | B25J 15/0608 700/213 |
| 2017/0010850 A1* | 1/2017 | Kobayashi | G02B 27/0093 |
| 2017/0044875 A1* | 2/2017 | Hebebrand | E21B 17/006 |
| 2017/0154446 A1* | 6/2017 | N | G06T 7/0002 |
| 2017/0318235 A1* | 11/2017 | Schneider | G06K 9/3233 |

FOREIGN PATENT DOCUMENTS

| | | |
|---|---|---|
| JP | 2002-133413 A | 5/2002 |
| JP | 2002-148001 A | 5/2002 |
| JP | 2011-086238 A | 4/2011 |
| JP | 2013-113809 A | 6/2013 |
| JP | 2013-152198 A | 8/2013 |

OTHER PUBLICATIONS

Office Action issued in Japanese family member Appl. No. 2015-066255, dated Dec. 18, 2018, along with an English translation thereof.

Office Action issued in Japanese family member Patent Appl. No. 2015-066255, dated Jul. 9, 2019, along with an English translation thereof.

* cited by examiner

MEASUREMENT-DATA COLLECTING APPARATUS AND COMPUTER PROGRAM

CROSS REFERENCE TO RELATED APPLICATIONS

This non-provisional application claims benefit pursuant to 35 U.S.C. § 119(e) of U.S. provisional patent application 62/576,189, filed Oct. 24, 2017, the entire contents of which are incorporated herein by reference.

BACKGROUND

Technical Field

The present invention relates to a measurement-data collecting apparatus and a computer program for collecting a measurement value by analyzing an image of a measurement tool on which a measurement result is displayed.

Related Art

In general, measurement values measured by measurement tools such as a caliper, a micrometer, and a dial gauge can be directly read or indirectly read by reading methods peculiar to the measurement tools from measurement results displayed on the measurement tools by a display, a scale, and the like. In the case of an analog measurement tool, collection of measurement data is performed by a method of, for example, copying a read measurement value to paper or inputting the measurement value to a personal computer. In the case of a digital measurement tool, collection of measurement data is performed by, besides the same method as the method by the analog measurement tool, a method of, for example, transferring measurement data electrically subjected to signal processing to a personal computer by wired communication or wireless communication. Examples of an apparatus that collects measurement data using the digital measurement tool include apparatuses described in JP H08-21154 A and JP 2589807 B.

SUMMARY OF THE INVENTION

Problems to be Solved by the Invention

When the measurement data is collected, in the analog measurement tool, time for copying the measurement value to the paper or inputting the measurement value to the personal computer is required or a mistake is likely to occur when the measurement value is copied or input. Further, in the measurement, a user cannot use any of the hands and it is difficult for the user to record the measurement value while performing the measurement. Therefore, the user has to record the measurement value every time the user performs the measurement and cannot continuously perform the measurement. Therefore, workability is low. On the other hand, in the digital measurement tool, the collection of the measurement data is relatively easy and a transfer mistake hardly occurs. However, because a CPU, a communication function, and the like are implemented, the digital measurement tool is expensive compared with the analog measurement tool. A cable is an obstacle when the data transfer is performed by the wired communication.

An object of the present invention is to provide a measurement-data collecting apparatus and a computer program capable of reading a measurement value from a measurement result and easily collecting measurement data irrespective of whether a measurement tool is an analog measurement tool or a digital measurement tool.

Means for Solving the Problems

In order to achieve the object, a measurement-data collecting apparatus of the present invention includes: an image capturing unit configured to capture image of an exterior view of a target measurement tool on which a measurement result is displayed; and a measurement-value reading unit configured to read a measurement value from an exterior view image of the target measurement tool captured by the image capturing unit. In the present invention, because the measurement value is read from the image captured from the target measurement tool, measurement data can be easily collected irrespective of whether a measurement tool is an analog measurement tool or a digital measurement tool. The measurement tool does not need to have a communication function. Even a user not knowing a method of reading a measurement value in the analog measurement tool can collect measurement data.

The measurement-data collecting apparatus of the present invention may further include: a tool-specifying-information storing unit configured to store tool specifying information for each of types of measurement tools; a tool specifying unit configured to compare the exterior view image of the target measurement tool and the tool specifying information stored in the tool-specifying-information storing unit and specify a type of the target measurement tool; a reading-method storing unit configured to store measurement-value reading methods for reading a measurement value from the exterior view image for each of the types of the measurement tools; and a reading-method specifying unit configured to specify, referring to the reading-method storing unit, a measurement-value reading method corresponding to the type of the target measurement tool specified by the tool specifying unit. The measurement-value reading unit may be configured to read the measurement value from the exterior view image of the target measurement tool with the measurement-value reading method specified by the reading-method specifying unit. The tool specifying information may be the entire or a part of the exterior view image of the measurement tool or may be identification information that can be directly or indirectly read from the exterior view image of the measurement tool. When the tool specifying information is the identification information, the tool specifying unit may directly or indirectly read the identification information from the exterior view image of the target measurement tool and compare the identification information with the tool specifying information. By configuring the measurement-data collecting apparatus in this way, a type of a measurement tool can be determined from an exterior view image. A measurement-value reading method corresponding to the type can be selected. Therefore, it is possible to read measurement values concerning a plurality of types of measurement tools.

The tool-specifying-information storing unit may further store tool specifying information for each individual of the measurement tools, the tool specifying unit may further specify an individual of the target measurement tool, and the measurement-data collecting apparatus may further include a reading control unit configured to emit a predetermined warning according to the individual of the target measurement tool specified by the tool specifying unit and/or control the measurement-value reading unit not to perform the reading of the measurement value. By configuring the measurement-data collecting apparatus in this way, it is possible to check whether a specified measurement tool has been calibrated and emit a warning and, when a calibration period has expired, take a safety measure for, for example, not performing the reading of the measurement value. A management manhour of the measurement tool can be reduced.

The measurement-data collecting apparatus of the present invention may further include: a frame mounted on a head of a user; an instruction input unit for inputting an instruction to the units; and an instruction recognizing unit configured to recognize an instruction content input to the instruction input unit. The image capturing unit may be provided in the frame in a direction in which a scene in a visual field direction of the user wearing the frame is captured as image, and the units may be configured to execute processing such as the image capturing and saving of the measurement value according to the instruction content recognized by the instruction recognizing unit. The instruction input unit may be, for example, a sound collecting unit. The user may input an instruction by voice. The instruction recognizing unit may be configured to recognize the instruction content from the voice collected by the sound collecting unit. By configuring the measurement-data collecting apparatus in this way, the user does not need to use the hands in the image capturing and the instruction input. Therefore, even in a state in which the user cannot use any of the hands, if the user turns the user's eyes on the target measurement tool, the image capturing unit can grasp the target measurement tool as an object. The user can instruct the image capturing by voice or the like.

A display unit configured to display the measurement value read by the measurement-value reading unit over the scene in the visual field direction of the user wearing the frame. By configuring the measurement-data collecting apparatus in this way, even when the analog measurement tool is used, the user can quickly visually recognize the measurement value as a numerical value.

The units provided in the frame and the other units may be communicably connected by radio. Consequently, an obstructive connection cable can be eliminated. A measurement place can be moved in a wirelessly communicable range. Therefore, work efficiency can be improved.

DETAILED DESCRIPTION OF THE EMBODIMENTS

Figure 1:
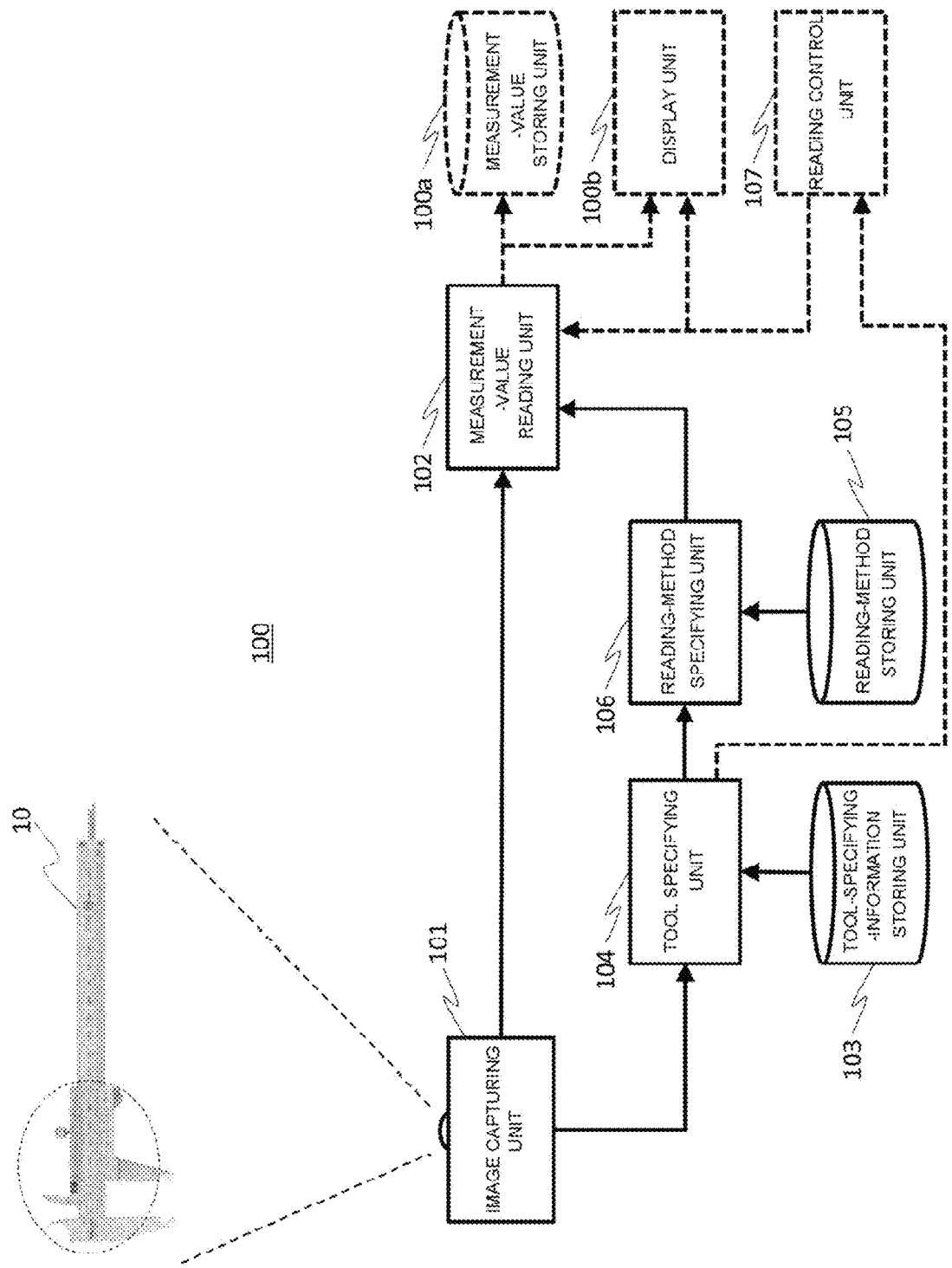
FIG. 1 is a diagram showing a configuration example of a measurement-data collecting apparatus in a first embodiment.

Embodiments of the present invention are explained below with reference to the drawings. Note that, in this specification and the figures, the same elements as the elements already described concerning the figures already referred to are denoted by the same reference numerals and signs and detailed explanation of the elements is omitted as appropriate.

First Embodiment

FIG. 1 is a diagram showing a configuration example of a measurement-data collecting apparatus 100 according to a first embodiment. The measurement-data collecting apparatus 100 includes an image capturing unit 101, a measurement-value reading unit 102, a tool-specifying-information storing unit 103, a tool specifying unit 104, a reading-method storing unit 105, and a reading-method specifying unit 106.

The image capturing unit 101 captures image of the exterior view of a target measurement tool on which a measurement result is displayed. As the image capturing unit 101, in general, use of a camera that captures a still image is assumed. However, the still image only has to be finally output, for example, a video camera that extracts a still image from a moving image and outputs the still image may be used. The target measurement tool is a measurement tool set as a target of reading of a measurement value by the measurement-data collecting apparatus 100. The target measurement tool may be any tool if a measurement result of the tool can be visually recognized from the exterior view of the tool. The measurement result is a measurement value itself in the case of a digital measurement tool. In the case of an analog measurement tool, the measurement result is an object from which a measurement value is read. In general, the measurement result is represented by a graduation or the like. The image capturing of the exterior view by the image capturing unit 101 needs to be performed at least in a range and at resolution necessary for reading the measurement result because it is necessary to read the measurement result from an exterior view image. For example, when the target measurement tool is a caliper 10 of an analog type shown in FIG. 1, the exterior view needs to be captured as image in a range and at resolution for enabling graduations to be read at least concerning a portion generally surrounded by a dotted line.

The measurement-value reading unit 102 reads a measurement value from the exterior view image of the target measurement tool captured by the image capturing unit 101. A method of reading the measurement value from the exterior view image is explained with reference to measurement tools shown in FIGS. 2 to 4 as examples.

Figure 2:
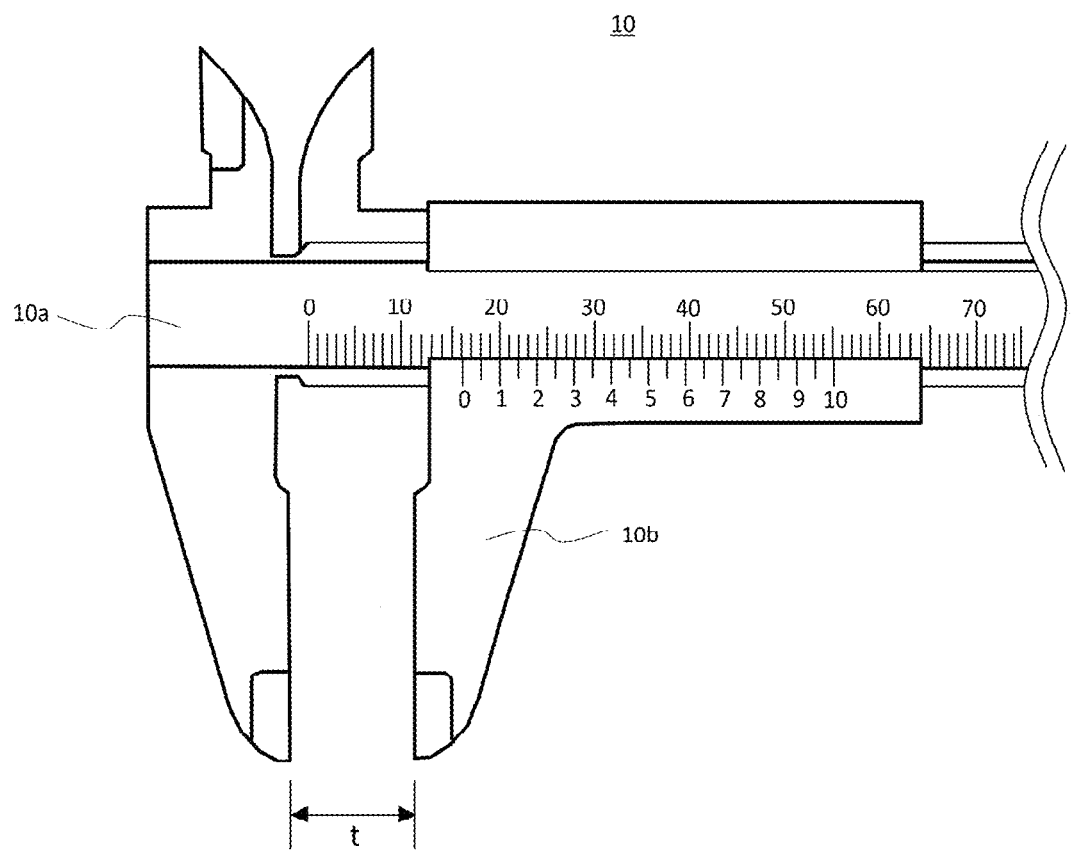
FIG. 2 is a diagram showing an example of a result display part of a caliper.

FIG. 2 is a diagram of an extract of a portion where a measurement result of the caliper 10 is displayed. The caliper 10 holds a target object of a dimension measurement between a main scale 10a and a slider 10b provided slidably in the longitudinal direction of the main scale 10a and measures width t of the held target object. A measurement value is read from a relative positional relation between main scale graduations allocated at every 1 mm in the main scale 10a and vernier graduations allocated at every 1.95 mm in the slider 10b.

Specifically, an integer portion of the measurement value is read by grasping which of the main scale graduations a graduation 0 on the leftmost side of the vernier graduations indicates. That is, when the graduation 0 on the leftmost side of the main scale graduations is represented as a 0-th graduation, if the graduation 0 of the vernier graduations indicates a graduation between an n-th graduation and an n+1-th graduation, the integer portion of the measurement value can be read as n. In an example shown in FIG. 2, the graduation 0 of the vernier graduations indicates a graduation between a sixteenth main scale graduation and a seventeenth main scale graduation. Therefore, the integer portion can be read as 16 mm. When the graduation 0 of the vernier graduations is represented as a 0-th graduation, by grasping a vernier graduation, where a main scale graduation and the vernier graduation are aligned on a straight line, is which graduation counted from the 0-th graduation, the decimal point of the measurement value is read in 0.05 mm units. In the example shown in FIG. 2, the main scale graduation and the vernier graduation are aligned on the straight line at a third vernier graduation. Therefore, the decimal point can be read as 3×0.05=0.15 mm. Consequently, the measurement value can be read as 16.15 mm.

When a measurement value is read from the exterior view image, the measurement value can be read by analyzing the image with the same method. For example, first, the measurement-value reading unit 102 grasps presence of the 0-th main scale graduation from the exterior view image of the target measurement tool on the basis of position information of the graduation 0 of the main scale in the exterior view of a measurement tool of the type of the target measurement tool prepared in advance or provided from another unit. Subsequently, the measurement-value reading unit 102 reads a measurement value of the exterior view image on the basis of a measurement-value reading method of the measurement tool corresponding to the type of the target measurement tool prepared in advance or provided from another unit. Specifically, the measurement-value reading unit 102 scans the exterior view image around the main scale graduations in a direction in which numbers of the graduations increase while counting the number of graduations from the grasped 0-th main scale graduation. When presence of the 0-th vernier graduation is detected, the measurement-value reading unit 102 specifies that a main scale graduation indicated by the vernier graduation is between the n-th graduation and the n+1-th graduation and reads an integer portion of the measurement value as n. When the main scale graduation and the vernier graduation are already aligned on the straight line, the measurement-value reading unit 102 reads the decimal point of the measurement value as 0. Otherwise, the measurement-value reading unit 102 further continues the scan of the exterior view image while counting the number of graduations of the vernier graduations. When a portion where a main scale graduation and a vernier graduation are aligned on a straight line, the measurement-value reading unit 102 specifies which vernier graduation the vernier graduation in that portion is. If the vernier graduation is an m-th vernier graduation, the measurement-value reading unit 102 multiplies m by 0.05 and reads the decimal point of the measurement value.

Figure 3A:
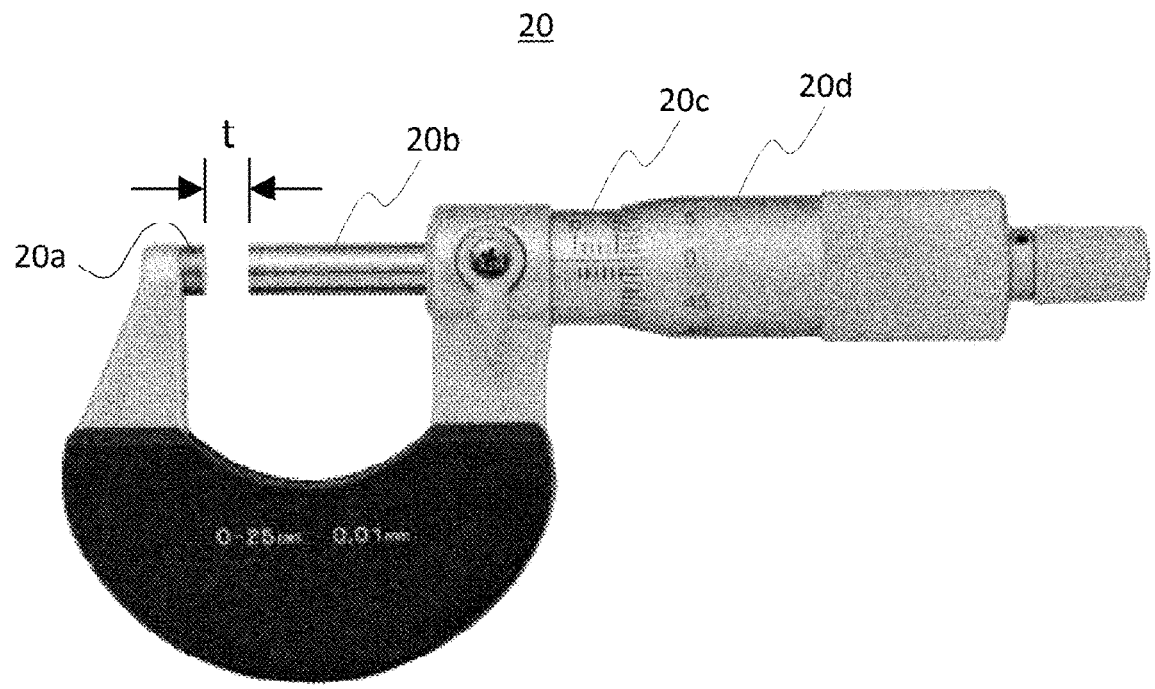
FIG. 3A is a diagram showing an example of the exterior view of a micrometer.
Figure 3B:
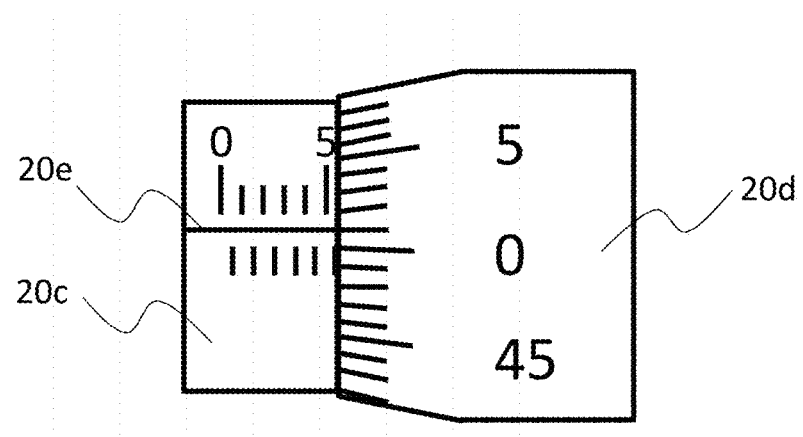
FIG. 3B is a diagram of an extract of a portion where a measurement result of the micrometer is displayed.

FIG. 3A is a diagram showing the exterior view of a micrometer 20, which is an example of a micrometer of an analog type. FIG. 3B is a diagram of an extract of a portion where a measurement result of the micrometer 20 is displayed. The micrometer 20 holds a target object of dimension measurement between an anvil 20a and a spindle 20b stretchable in an axial direction by rotating a thimble 20d with a sleeve 20c as an axis and measures width t of the held target object. A measurement value is read from a relative positional relation between sleeve graduations allocated at every 0.5 mm in the sleeve 20c and thimble graduations allocated at every 0.01 mm in the thimble 20d.

Specifically, first, the micrometer 20 reads the measurement value in 0.5 mm units according to, when a graduation 0 on the leftmost side of the sleeve graduations is represented as a 0-th graduation, up to which graduation counted from the 0-th graduation is exposed. In an example shown in FIG. 3B, graduations up to an eleventh sleeve graduation are exposed. Therefore, the measurement value can be read as 11×0.5=5.5 mm. Further, according to which thimble graduation of the thimble graduations a reference line 20e of the sleeve 20c indicates, the micrometer 20 reads a value of 0 mm or more and less than 0.5 mm added to a value indicated by the sleeve graduation. The reading is performed, for example, on the basis of a graduation to which a number nearest from the thimble graduation indicated by the reference line 20e is allocated, according to which graduation counted from the graduation the thimble graduation is. As the thimble graduations, numbers are allocated for every five graduations between the 0-th graduation to a forty-ninth graduation. Because the graduations are allocated at every 0.01 mm, values of 0.01 times of numbers of the graduations are actual values. In the example shown in FIG. 3B, the number of the graduation indicating the number nearest from the thimble graduation indicated by the reference line 20e is 0, that is, the 0-th graduation. The reference line 20e indicates a first graduation in a direction in which the numbers of the graduations increase. Therefore, the graduation corresponds to the first graduation as a whole from 0+1=1. Therefore, a value added to the value indicated by the sleeve graduation is 1×0.01=0.01 mm. Consequently, the measurement value can be read as 5.51 mm. If the number nearest from the thimble graduation indicated by the reference line 20e is 45 and the reference line 20e indicates a second graduation in a direction in which the numbers of the graduations decrease from the number of the graduation, the graduation corresponds to a forty-third graduation as a whole from 45−2=43. Therefore, the value added to the value indicated by the sleeve graduation is 43×0.01=0.43 mm. Therefore, in this case, the measurement value can be read as 5.93 mm.

When the measurement value is read from the exterior view image, the measurement value can be read by analyzing the image with the same method. For example, first, the measurement-value reading unit 102 grasps presence of the 0-th sleeve graduation from the exterior view image of the target measurement tool on the basis of position information of the graduation 0 of the sleeve in the exterior view of a measurement tool of the type of the target measurement tool prepared in advance or provided from another unit. Subsequently, the measurement-value reading unit 102 reads a measurement value of the exterior view image on the basis of a measurement-value reading method of the measurement tool of the type of the target measurement tool prepared in advance or provided from another unit. Specifically, the measurement-value reading unit 102 scans the exterior view image around the sleeve graduations centering on the reference line 20e in a direction in which numbers of the graduations increase while counting the number of graduations from the grasped 0-th sleeve graduation. When an end portion of the thimble is detected, the measurement-value reading unit 102 specifies that a sleeve graduation exposed at that point in time is the n-th sleeve graduation, multiplies n by 0.5, and reads a value in 0.5 mm units of the measurement value. The measurement-value reading unit 102 scans and grasps a number m of a thimble graduation shown nearest to the thimble graduation indicated by the reference line 20e. The measurement-value reading unit 102 scans the exterior view image around the thimble graduation in a direction in which the numbers of the graduations increase (or decrease) while counting the number of graduations from the grasped m-th thimble graduation and detects the reference line 20e. The measurement-value reading unit 102 specifies which thimble graduation counted from the m-th thimble graduation the thimble graduation indicated by the detected reference line 20e is. If the thimble graduation is a second thimble graduation, the measurement-value reading unit 102 multiplies m+2 by 0.01 and reads a value in 0.01 mm units of the measurement value.

Note that, because the thimble 20d continuously rotates, a position where the reference line 20e indicates a thimble graduation does not always coincide with a graduation. A method of reading a value in such a case is arbitrary. It is possible to adopt a method of, for example, more finely reading a value or treating the value as indicating any near graduation.

Figure 4A:
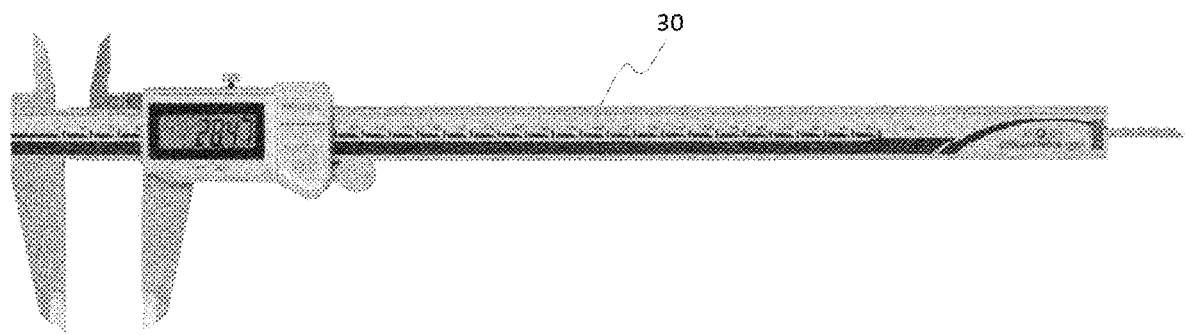
FIG. 4A is a diagrams showing an example of the exterior view of a digital caliper.
Figure 4B:
FIG. 4B is a diagram of an extract of a portion where a measurement result of the digital caliper is displayed.

FIG. 4A is a diagram showing the exterior view of a digital caliper 30, which is an example of a digital caliper. FIG. 4B is a diagram of an extract of a portion where a measurement result of the digital caliper 30 is displayed. In the digital caliper 30, a measurement value is directly displayed on a display portion 30a. Therefore, when a measurement value is read from an exterior view image, for example, the measurement-value reading unit 102 grasps presence of the display portion 30a from an exterior view image of a target measurement tool on the basis of position information of the display portion 30a in the exterior view of a measurement tool of the type of the target measurement tool prepared in advance or provided from another unit. Subsequently, the measurement-value reading unit 102 reads a measurement value from the exterior view image on the basis of a measurement-value reading method of the measurement tool of the type of the target measurement tool prepared in advance or provided from another unit. Specifically, the measurement-value reading unit 102 respectively compares numbers of digits displayed on the display portion 30a of the target measurement tool and shapes of numbers 0 to 9 peculiar to the display portion 30a of the measurement tool of the type of the target measurement tool and specifies the numbers of the digits displayed on the display portion 30a of the target measurement tool to thereby read the measurement value.

When the image capturing of the exterior view by the image capturing unit 101 is not performed in a range and at resolution necessary for reading a measurement result, the measurement-value reading unit 102 may be configured to emit a warning indicating that reading is impossible. When the image capturing unit 101 is configured to automatically retry the image capturing when the reading is impossible, the measurement-value reading unit 102 may be configured to perform the reading at a point in time when the reading is possible and emit a warning when the retry is performed a predetermined number of times and the reading is impossible. It is determined that the reading is impossible if a captured image is analyzed and, for example, pixels equal to or more than a threshold are absent between graduation lines.

When there is only one type of a target measurement tool, it is unnecessary to specify a type of a measurement tool and specify a reading method for a measurement value corresponding to the type. Therefore, the measurement-value reading unit 102 reads, on the basis of a measurement-value reading method of the measurement tool of the type prepared in advance, a measurement value from a measurement result displayed on an exterior view image.

On the other hand, when there are a plurality of types of target measurement tools, it is necessary to specify a type of a measurement tool and specify a reading method for a measurement value corresponding to the type. Therefore, the tool-specifying-information storing unit 103, the tool specifying unit 104, the reading-method storing unit 105, and the reading-method specifying unit 106 are further provided in a pre-stage of the measurement-value reading unit 102.

The tool-specifying-information storing unit 103 stores tool specifying information for each of types of measurement tools. The tool specifying information is, for example, an exterior view image of a measurement tool or identification information that can be directly or indirectly read from the exterior view image of the measurement tool. The identification information is, for example, a name of the type of the measurement tool, a model number, and a manufacturing number. When the exterior view image of the measurement tool is stored, the exterior view image to be stored may be an entire image of the measurement tool or may be an image of a characteristic part that can specify the measurement tool. The exterior view image may be a two-dimensional image or may be a three-dimensional shape model. The two-dimensional image can be easily prepared. On the other hand, during the image capturing of the exterior view of the target measurement tool, when the image capturing is performed at an angle greatly different from an image capturing angle of the exterior view image stored in advance in the tool-specifying-information storing unit 103, it is likely that images cannot be successfully compared when the images are compared by the tool specifying unit 104. On the other hand, although it is not easy to prepare the three-dimensional shape model, it is possible to compare with exterior view images at a plurality of angles concerning one type of a measurement tool when images are compared by the tool specifying unit 104. Therefore, comparison mistakes and errors can be reduced.

The tool specifying unit 104 compares the exterior view image of the target measurement tool and the tool specifying information stored in the tool-specifying-information storing unit 103. Because a target to be specified is a measurement tool itself, the image capturing of the exterior view by the image capturing unit 101 needs to be performed not only in a portion where a measurement result is displayed but also in a range and at resolution with which a type of a measurement tool can be specified by being compared with the tool specifying information stored in the tool-specifying-information storing unit 103. When the tool specifying information is an exterior view image of the measurement tool, the entire exterior view of the target measurement tool does not always need to be captured as image. If the comparison is possible with a characteristic part of the exterior view, the part only has to be included in an image capturing range. When the exterior view image of the measurement tool is a three-dimensional shape model, the comparison with the exterior view image of the target measurement tool in the tool specifying unit 104 can be performed using exterior view images from a plurality of viewpoints extractable from the three-dimensional shape model. On the other hand, when the tool specifying information is identification information, the tool specifying unit 104 directly or indirectly reads the identification information from the exterior view image of the target measurement tool. That is, when the identification information is directly written on the measurement tool, the tool specifying unit 104 reads a portion of the writing from the exterior view image. When the identification information is indirectly written on the measurement tool as a logo, a barcode, a QR code (registered trademark), or the like, the tool specifying unit 104 reads the identification information from the exterior view image via the logo or the code.

The reading-method storing unit 105 stores a measurement-value reading method for reading a measurement value from an exterior view image for each of types of measurement tools. Examples of information stored as the measurement-value reading method include a method of reading a measurement value from a position of a display part of a measurement result in the exterior view of a measurement tool or from the measurement result. A specific example of the measurement-value reading method for reading a measurement value from a measurement result is as explained above with reference to FIG. 2, FIG. 3A, FIG. 3B, FIG. 4A and FIG. 4B. The reading-method specifying unit 106 specifies, referring to the reading-method storing unit 105, a measurement-value reading method corresponding to the type of the measurement tool specified by the tool specifying unit 104.

Finally, the measurement-value reading unit 102 reads a measurement value from the exterior view image of the target measurement tool by the measurement-value reading method specified by the reading-method specifying unit 106. The measurement-value reading unit 102 causes, for example, a measurement-value storing unit 100a to store the read measurement value. In general, it is assumed that permanent storing units such as a hard disk, a removable disk, or a memory card are used as the measurement-value storing unit 100a. However, transitory storing units such as a semiconductor memory may be used according to necessity.

By configuring the measurement-data collecting apparatus 100 as explained above, the type of the measurement tool can be specified from the exterior view image. The measurement-value reading method corresponding to the specified type can be selected. Therefore, measurement values can be read concerning a plurality of types of measurement tools. When types of measurement tools desired to be used increase, information concerning measurement tools to be added anew only has to be added to the tool-specifying-information storing unit 103 and the reading-method storing unit 105 without changing the entire configuration of the apparatus.

The measurement value read by the measurement-value reading unit 102 may be displayed on a display unit 100b. Consequently, even when an analog measurement tool is used, a measurement value can be visually recognized as a numerical value. In this case, in particular, this contributes to improvement of work efficiency of a user who does not know a method of reading a measurement value from a graduation or cannot smoothly read the measurement value.

The tool-specifying-information storing unit 103 may further store tool specifying information for each individual of the measurement tools, the tool specifying unit 104 may further specify an individual of the target measurement tool, and the measurement-data collecting apparatus 100 may further include a reading control unit 107 configured to emit a predetermined warning to the display unit 100b or the like according to the individual of the measurement tool specified by the tool specifying unit 104 and/or control the measurement-value reading unit 102 not to perform the reading of the measurement value. In general, calibration of a measurement tool is usually performed by a management department (a department in charge) of the measurement tool and is not performed by an operator every time the operator uses the measurement tool. Therefore, it is likely that, when management is not thoroughly performed in a small company or the like, measurement is performed using an expired measurement tool. Therefore, by adopting such a configuration, it is possible to check whether a specified measurement tool has been calibrated and emit a warning and, when a calibration period has expired, take a safety measure for, for example, not performing the reading of the measurement value. A management manhour of the measurement tool can be reduced.

Second Embodiment

Figure 5:
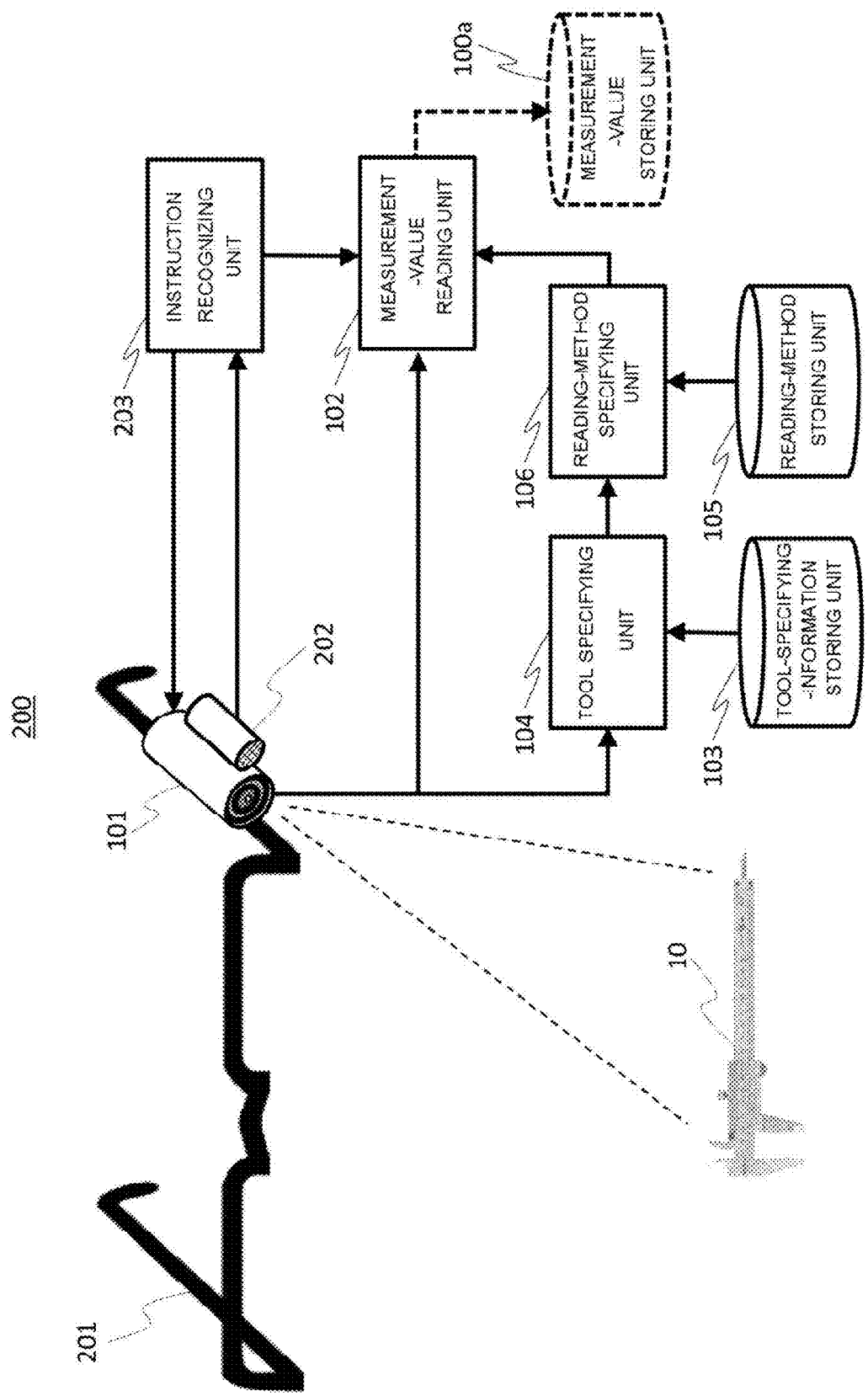
FIG. 5 is a diagram showing a configuration example of a measurement-data collecting apparatus in a second embodiment.

FIG. 5 is a diagram showing a configuration example of a measurement-data collecting apparatus 200 according to a second embodiment. The measurement-data collecting apparatus 200 includes the image capturing unit 101, the measurement-value reading unit 102, the tool-specifying-information storing unit 103, the tool specifying unit 104, the reading-method storing unit 105, the reading-method specifying unit 106, a frame 201, an instruction input unit 202, and an instruction recognizing unit 203. That is, in the measurement-data collecting apparatus 200, the frame 201, the instruction input unit 202, and the instruction recognizing unit 203 are added to the measurement-data collecting apparatus 100.

The frame 201 is mounted on the head of a user of the measurement-data collecting apparatus 200. In the frame 201, the image capturing unit 101 is provided in a direction in which a scene in a visual field direction of the user wearing the frame 201 is captured as image. Consequently, the user wearing the frame 201 on the head looks at a target measurement tool to perform measurement operation by the target measurement tool. Then, the user can direct, without using the hands, the image capturing unit 101 to a direction in which the target measurement tool is captured as image. Note that the shape of the frame 201 is arbitrary as long as the frame 201 can be mounted on the head and the image capturing unit 101 can be provided in the frame 201.

The instruction recognizing unit 203 recognizes an instruction content for the units input to the instruction input unit 202. The units execute predetermined processing corresponding to the instruction content. For example, when an instruction "image capturing" is input, the instruction recognizing unit 203 recognizes the instruction and gives an instruction for image capturing to the image capturing unit 101. When an instruction "saving" is input, the instruction recognizing unit 203 recognizes the instruction and instructs the measurement-value reading unit 102 to store a measurement value in the measurement-value storing unit 100a. A place where the instruction input unit 202 is provided is arbitrary. However, the instruction input unit 202 is suitably provided in the frame 201 from the viewpoint of allowing the user to easily input an instruction during measurement operation. On the other hand, the instruction recognizing unit 203 may be provided in the frame 201 or may be provided in another place.

The instruction input unit 202 is configured as a sound collecting unit such as a microphone and the instruction recognizing unit 203 is configured to recognize instruction content from voice collected by the sound collecting unit.

Then, for example, when voice "image capturing" is collected, the instruction recognizing unit 203 can recognize an image capturing instruction from the voice and give an instruction for image capturing to the image capturing unit 101. When voice "saving" is collected, the instruction recognizing unit 203 can recognize a saving instruction for a measurement value from the voice and can give an instruction to the measurement-value reading unit 102 to store the measurement value in the measurement-value storing unit 100*a*. Consequently, the user does not need to use the hands when inputting an instruction. The user can change, without using the hands, a direction of image capturing to a direction in which the target measurement tool is captured as image. Therefore, it is possible to execute the image capturing of the target measurement tool and the saving of the measurement value without using the hands at all. Therefore, even if both the hands are used for measurement operation by the target measurement tool, the user can capture image of the target measurement tool and read the measurement value by inputting an instruction to the measurement-data collecting apparatus 200 with voice or the like. Note that the example is explained above in which the instruction is input by the voice. However, the instruction may be input by, for example, a blink or another body motion of the user other than the voice.

The measurement-value reading unit 102, the tool-specifying-information storing unit 103, the tool specifying unit 104, the reading-method storing unit 105, and the reading-method specifying unit 106 may be provided in the frame 201 and integrally configured or may be provided in another place separate from the frame 201. When the units are provided in the other place, whether all of the units are provided in the other place or a part of the units are provided in the other place may be arbitrarily determined considering structure design and the like of the frame 201.

Third Embodiment

Figure 6:
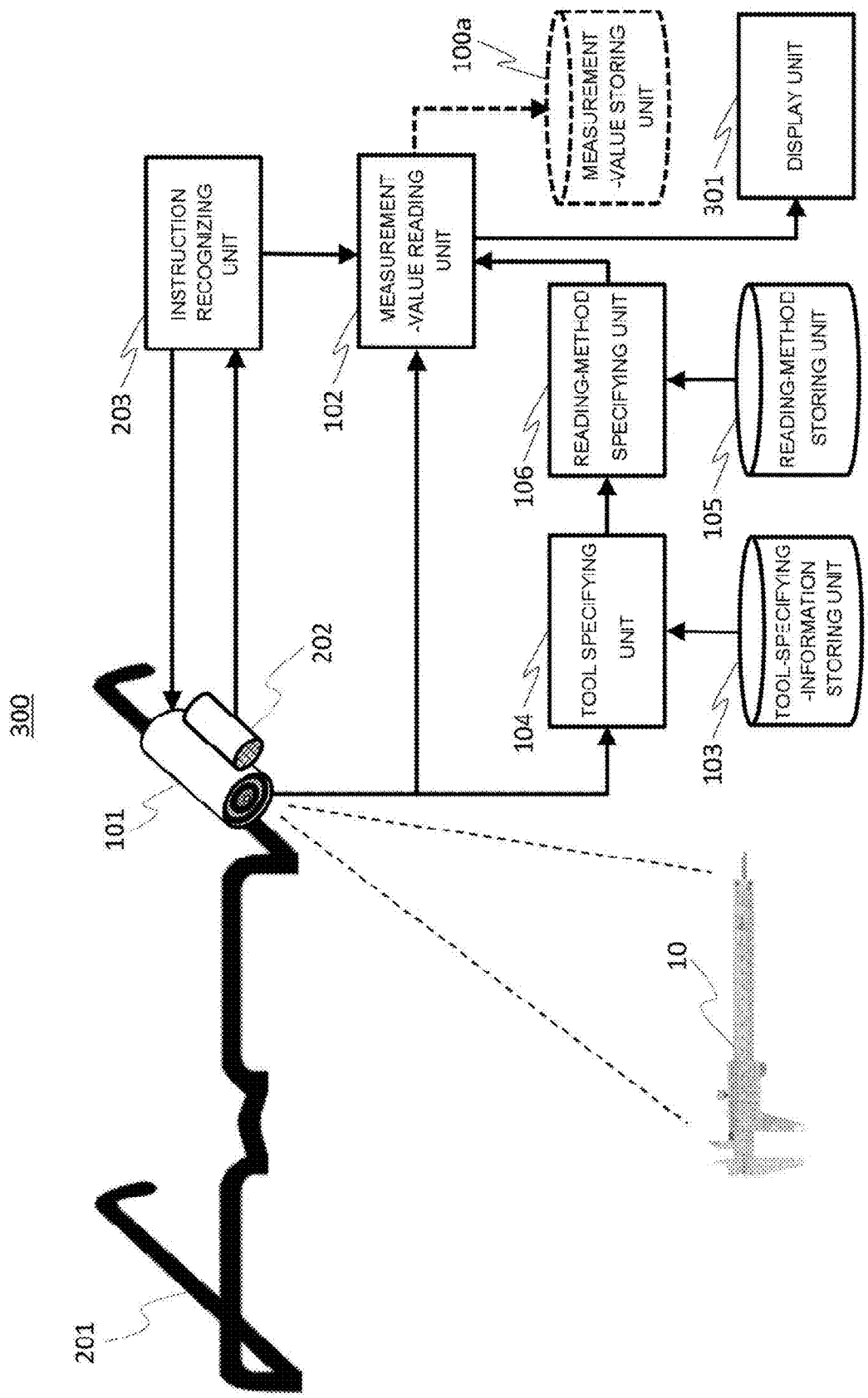
FIG. 6 is a diagram showing a configuration example of a measurement-data collecting apparatus in a third embodiment.

FIG. 6 is a diagram showing a configuration example of a measurement-data collecting apparatus 300 according to a third embodiment. The measurement-data collecting apparatus 300 includes the image capturing unit 101, the measurement-value reading unit 102, the tool-specifying-information storing unit 103, the tool specifying unit 104, the reading-method storing unit 105, the reading-method specifying unit 106, the frame 201, the instruction input unit 202, the instruction recognizing unit 203, and a display unit 301. That is, in the measurement-data collecting apparatus 300, the display unit 301 is added to the measurement-data collecting apparatus 200.

The display unit 301 displays a measurement value read by the measurement-value reading unit 102 over a scene in a visual field direction of a user wearing the frame 201. By providing the display unit 301 in the frame 201, a measurement value can be visually recognized as a numerical value even when an analog measurement tool is used. This contributes to improvement of work efficiency of a user who does not know a method of reading a measurement value from a graduation or cannot smoothly read the measurement value. The effect can also be obtained by providing a display unit in a place different from the frame 201. However, by providing the display unit 301 in the frame 201 as in this embodiment, the user can quickly confirm the measurement value without looking away or moving the body during measurement operation. This contributes to further improvement of the work efficiency.

Figure 7:
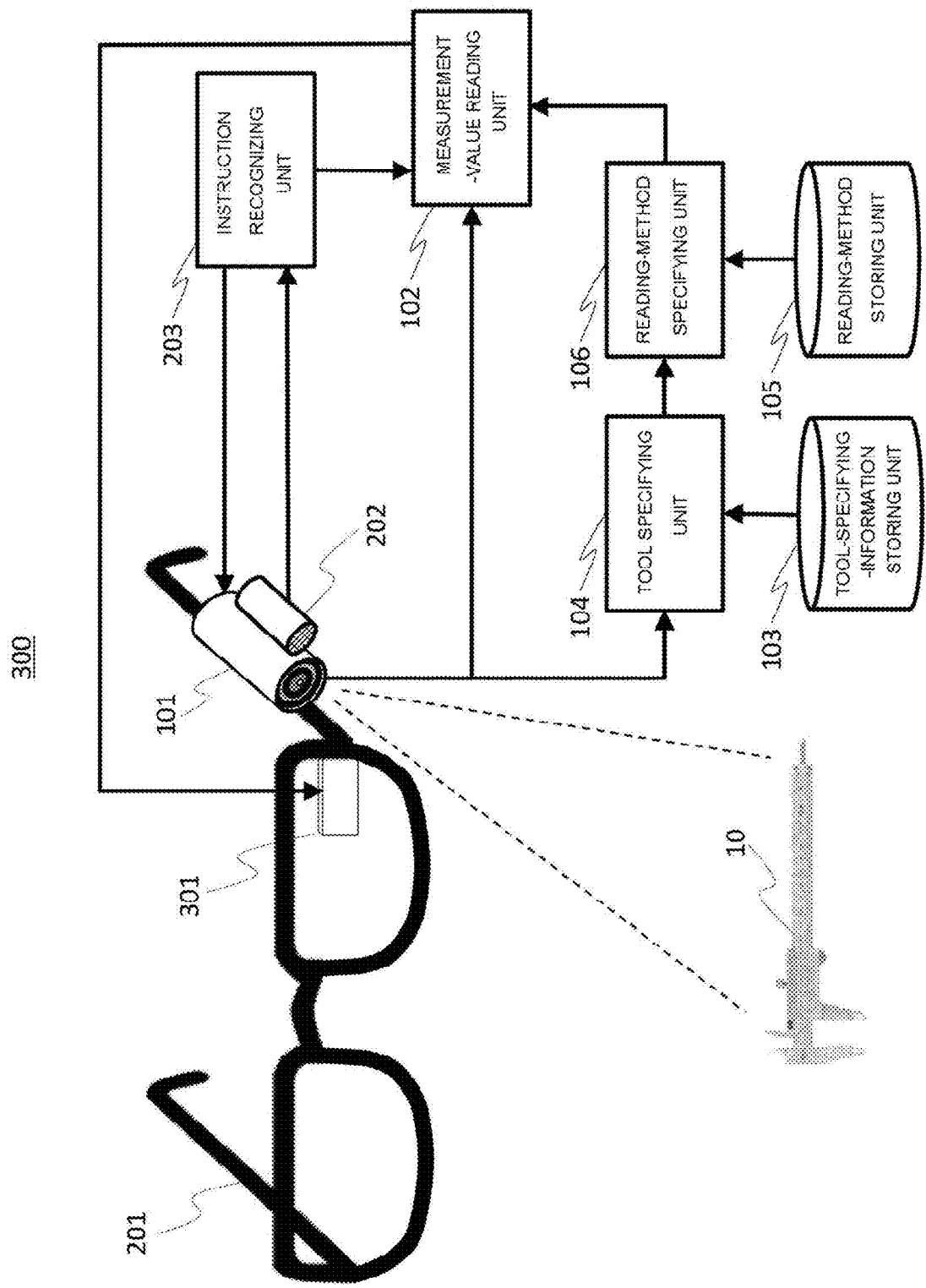
FIG. 7 is another diagram showing the configuration example of the measurement-data collecting apparatus in the third embodiment.

The display unit 301 configured to display the measurement value read by the measurement-value reading unit 102 over the scene in the visual field direction of the user wearing the frame 201 is configured to realize so-called augmented reality (AR). That is, the display unit 301 realizes the augmented reality in a form of adding additional information of a measurement value to a real environment in which measurement operation is performed and presenting the additional information. Specifically, for example, the augmented reality can be realized by providing the display unit 301, which is a transmission-type display, in the frame 201 of an eyeglass type shown in FIG. 7. Besides, the augmented reality can also be realized by a head mounted display of a transmission type. In the head mounted display, the display unit 301 is provided in the frame 201 of a head mount type. When the head mounted display of the transmission type is mounted, a state of the outside cannot be directly seen. However, because the scene in the visual field direction of the user is projected on a display. Therefore, the augmented reality can be realized by displaying the measurement value over the scene.

The measurement-value reading unit 102, the tool-specifying-information storing unit 103, the tool specifying unit 104, the reading-method storing unit 105, and the reading-method specifying unit 106 may be provided in the frame 201 and integrally configured or may be provided in another place separate from the frame 201. When the units are provided in the other place, whether all of the units are provided in the other place or a part of the units are provided in the other place may be arbitrarily determined considering structure design and the like of the frame 201.

Fourth Embodiment

Figure 8:
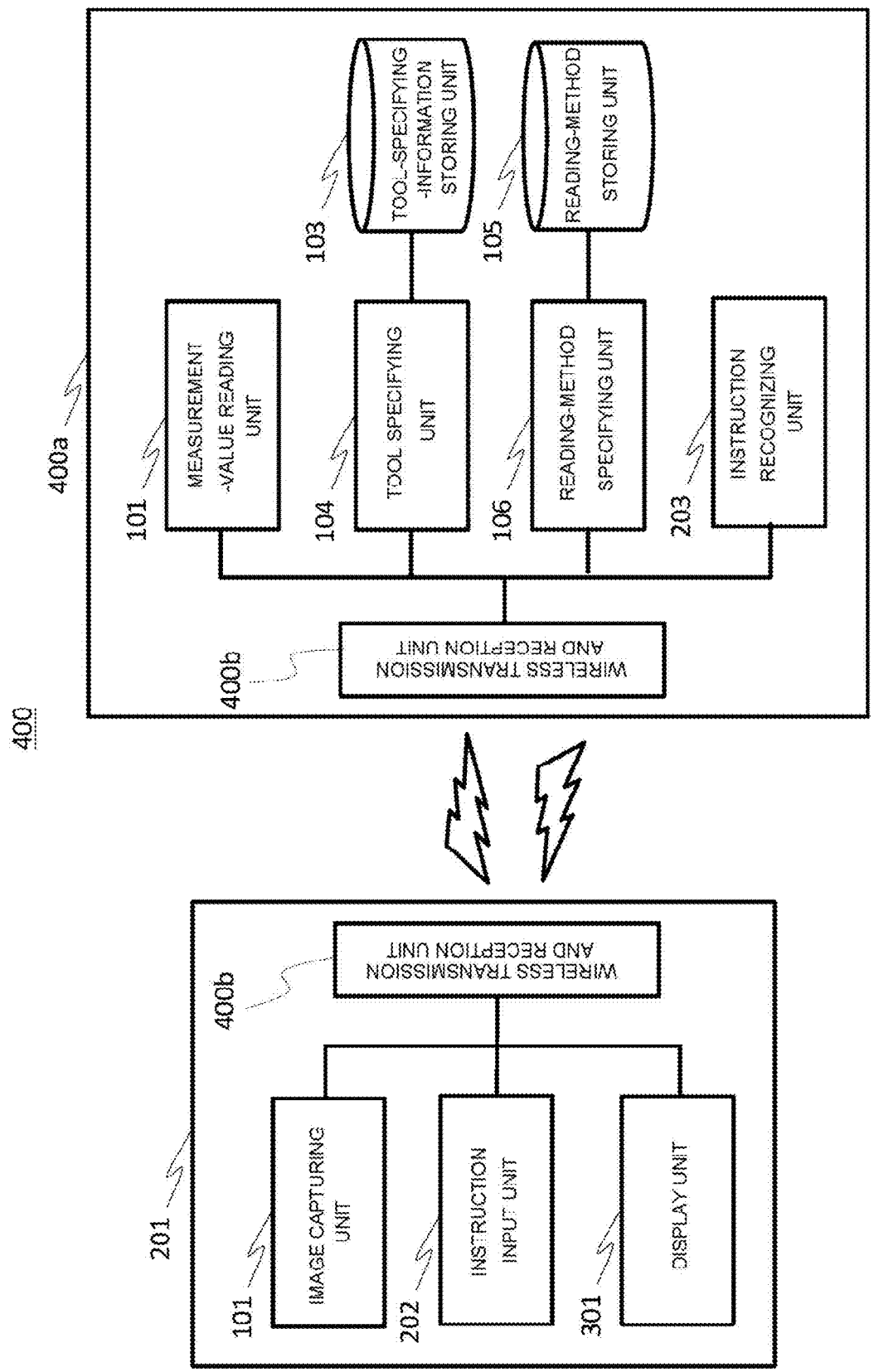
FIG. 8 is a diagram showing a configuration example of a measurement-data collecting apparatus in a fourth embodiment.

FIG. 8 is a diagram showing a configuration example of a measurement-data collecting apparatus 400 according to this embodiment. In the measurement-data collecting apparatus 400, the units provided in the frame 201 and the other units are configured to be communicable by radio in the measurement-data collecting apparatus 300. In the following explanation, a set of the other units other than the units provided in the frame 201 is referred to as data collecting portion 400*a*. The data collecting portion 400*a* can be configured by, for example, applying a computer program describing processing contents in the units to a portable terminal such as a smartphone or a personal computer. The frame 201 and the data collecting portion 400*a* respectively include wireless transmission and reception units 400*b*. A wireless communication scheme of the wireless transmission and reception unit 400*b* is arbitrary. The units provided in the frame 201 transmit and receive information to and from the units of the data collecting portion 400*a* via the wireless transmission and reception unit 400*b*. By configuring the measurement-data collecting apparatus 400 in this way, an obstructive connection cable can be eliminated. Further, a measurement place can be moved in a wirelessly communicable range. Therefore, work efficiency can be improved. In particular, when a portable terminal is applied as the data collecting portion 400*a*, the distance to the frame 201 is maintained as long as the user carries the portable terminal. Therefore, a movement range is not limited. Note that a configuration is illustrated in which the image capturing unit 101, the instruction input unit 202, the display unit 301, and the wireless transmission and reception unit 400*b* are provided in the frame 201 and the other units are provided in the data collecting portion 400*a*. However, to which of the frame 201 and the data collecting portion 400*a* the units are allocated may be arbitrarily determined while considering structure design and the like of the frame 201 in the scope of the technical idea represented in the present invention specifically explained in the first to third embodiments.

Figure 9:
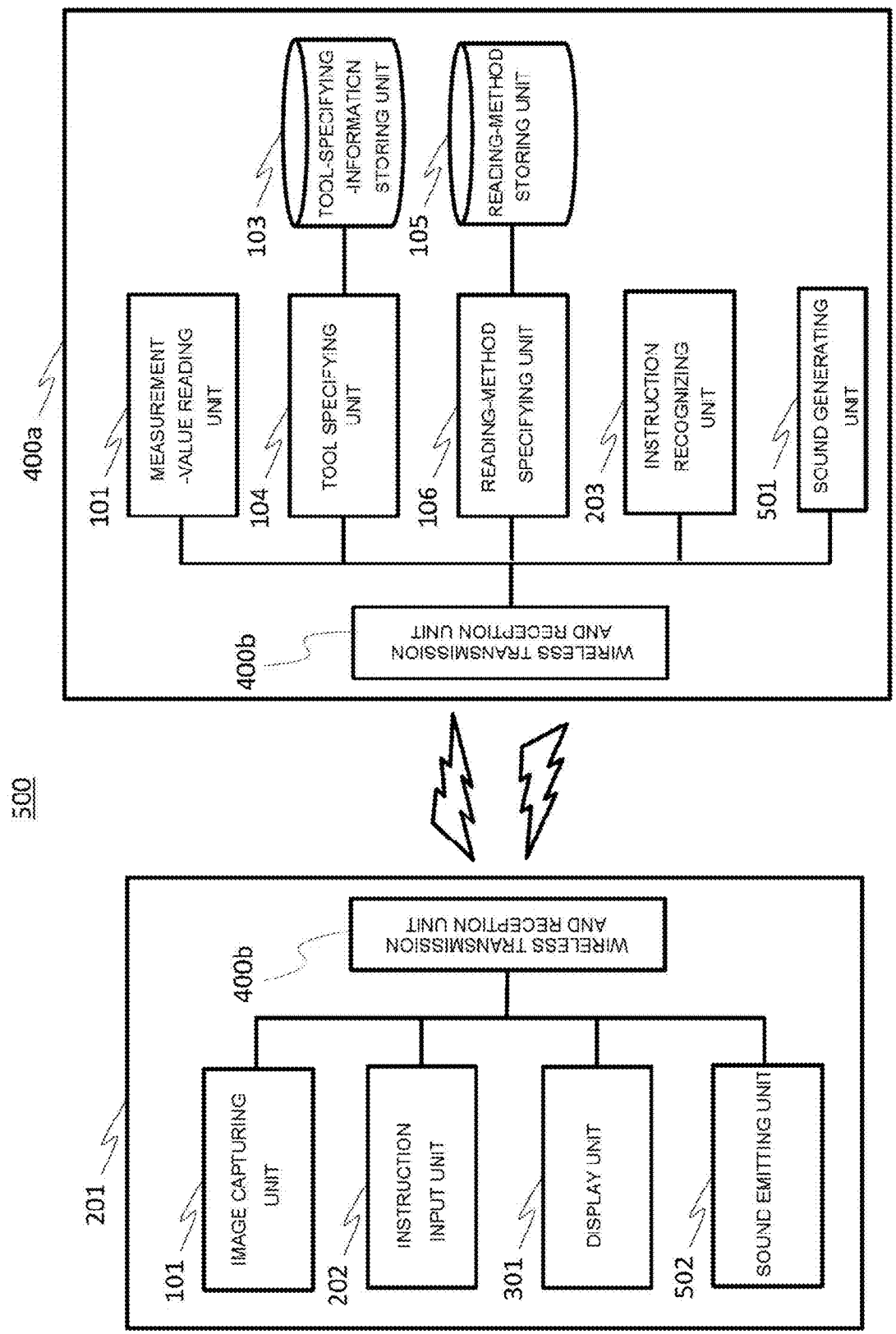
FIG. 9 is a diagram showing a configuration example of a measurement data collecting apparatus in a modification of the fourth embodiment.

A configuration example of a measurement-data collecting apparatus 500, which is a modification of the measurement-data collecting apparatus 400, is shown in FIG. 9. In addition to the components of the measurement-data collecting apparatus 400, the measurement-data collecting apparatus 500 includes a sound generating unit 501 in the data collecting portion 400a and includes a sound emitting unit 502 such as a speaker in the frame 201. When some problem such as a failure in reading of a measurement value occurs in the units of the data collecting portion 400a, the sound generating unit 501 generates a warning sound, a voice message, or the like indicating the occurrence of the problem and emits the warning sound, the voice message, or the like from the sound emitting unit 502 provided in the frame 201. Consequently, the user wearing the frame 201 can quickly recognize the occurrence of the problem in the data collecting portion 400a with the sound emitted from the sound emitting unit 502. The sound generating unit 501 may be configured to not only generate the sound for informing the problem occurrence to the user but also generate voice for notifying information such as measurement support to the user. Consequently, it is possible to further achieve improvement of convenience.

The functions and the processing in the units configuring the measurement-data collecting apparatuses in the embodiments may be combined or divided according to necessity. The functions and the processing can be changed as appropriate within the scope of the technical idea represented in the present invention. Such changed or improved forms are also included in the technical scope of the present invention.

When a computer is caused to function as the units configuring the present invention, the processing contents in the units are described by computer programs. The computer programs are stored in, for example, a hard disk device. When the computer programs are executed, necessary computer programs and data are read into a random access memory (RAM). The computer programs are executed by a CPU, whereby the processing contents are realized on the computer.

What is claimed is:

1. A measurement-data collecting apparatus comprising:
   an image capturing unit configured to capture image of an exterior view of a target measurement tool on which a measurement result is displayed;
   a tool-specifying-information storing unit configured to store tool specifying information, which is a three-dimensional shape model for each of types of measurement tools;
   a tool specifying unit configured to compare the exterior view image of the target measurement tool and the tool specifying information using a plurality of exterior view images from a plurality of viewpoints extractable from the three-dimensional shape model and specify a type of the target measurement tool;
   a reading-method storing unit configured to store measurement-value reading methods for reading a measurement value from the exterior view image for each of the types of the measurement tools;
   a reading-method specifying unit configured to specify, referring to the reading-method storing unit, a measurement-value reading method corresponding to the type of the target measurement tool specified by the tool specifying unit; and
   a processor and a memory that stores an instruction, wherein upon execution of the instruction, the processor operates as a measurement-value reading unit configured to read a measurement value from an exterior view image of the target measurement tool captured by the image capturing unit with the measurement-value reading method specified by the reading-method specifying unit.

2. The measurement-data collecting apparatus according to claim 1, wherein
   the tool-specifying-information storing unit further stores tool specifying information for each individual of the measurement tools,
   the tool specifying unit further specifies an individual of the target measurement tool, and
   the measurement-data collecting apparatus further comprises a reading control unit configured to emit a predetermined warning according to the individual of the target measurement tool specified by the tool specifying unit and/or control the measurement-value reading unit not to perform the reading of the measurement value.

3. The measurement-data collecting apparatus according to claim 1, further comprising:
   a frame mounted on a head of a user;
   an instruction input unit for inputting an instruction content; and
   an instruction recognizing unit configured to recognize the instruction content input to the instruction input unit, wherein
   the image capturing unit is provided in the frame in a direction in which a scene in a visual field direction of the user wearing the frame is captured as image, and
   the image capturing unit and the measurement-value reading unit execute predetermined processing according to the instruction content recognized by the instruction recognizing unit.

4. The measurement-data collecting apparatus according to claim 3, wherein
   the instruction input unit is a sound collecting unit, and
   the instruction recognizing unit recognizes the instruction content from voice collected by the sound collecting unit.

5. The measurement-data collecting apparatus according to claim 3, further comprising a display unit provided on the frame and configured to display the measurement value read by the measurement-value reading unit over the scene in the visual field direction of the user wearing the frame.

6. The measurement-data collecting apparatus according to claim 3, wherein at least the image capturing unit provided in the frame communicates by wireless communication.

7. A computer program stored in a non-transitory computer readable storage medium for causing a computer to function as the tool-specifying-information storing unit, tool specifying unit, reading-method storing unit, and reading-method specifying unit according to claim 1.

8. The measurement-data collecting apparatus according to claim 1, wherein the measurement-value reading unit is configured to retry reading the measurement value a predetermined number of times and emit a warning after the retry is performed the predetermined number of times.

* * * * *